US011686517B2

(12) United States Patent
McDonough et al.

(10) Patent No.: US 11,686,517 B2
(45) Date of Patent: Jun. 27, 2023

(54) ON BOARD CHILLER CAPACITY CALCULATION (71) Applicant: CARRIER CORPORATION, Farmington, CT (US)

(72) Inventors: Scott T. McDonough, Charlotte, NC (US); Walter E. Bujak, Jr., Suffield, CT (US); Christopher Young, Kennesaw, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 474 days.

(21) Appl. No.: 15/526,986

(22) PCT Filed: Nov. 12, 2015

(86) PCT No.: PCT/US2015/060341
§ 371 (c)(1),
(2) Date: May 15, 2017

(87) PCT Pub. No.: WO2016/077559
PCT Pub. Date: May 19, 2016

(65) Prior Publication Data
US 2017/0336119 A1 Nov. 23, 2017

Related U.S. Application Data (60) Provisional application No. 62/079,999, filed on Nov. 14, 2014.

(51) Int. Cl.
F25B 49/02 (2006.01)
F25B 25/00 (2006.01)
(Continued)

(52) U.S. Cl.
CPC ............. F25B 49/022 (2013.01); F24F 3/06 (2013.01); F25B 5/02 (2013.01); F25B 25/005 (2013.01);
(Continued)

(58) Field of Classification Search
CPC ........ F25B 49/022; F25B 25/005; F25B 5/02; F25B 5/005; F24F 3/06
See application file for complete search history.

(56) References Cited

U.S. PATENT DOCUMENTS 3,670,806 A * 6/1972 McFarlan ................ F24F 3/10
165/210
4,501,126 A * 2/1985 Norton ..................... F25B 5/02
417/313
(Continued)

FOREIGN PATENT DOCUMENTS

KR 101702178 B1 * 2/2017 ............... F25B 7/00
WO 2009031425 A1 3/2009

OTHER PUBLICATIONS

Park, Chiller System, Aug. 22, 2014, Full Document (Year: 2014).*
(Continued)

Primary Examiner — Nael N Babaa
(74) Attorney, Agent, or Firm — Cantor Colburn LLP (57) ABSTRACT A method of controlling operation of an air conditioning system (10) includes measuring a compressor speed of one or more chillers (12) of an air conditioning system and measuring a refrigerant pressure of the one or more chillers of the air conditioning system. A chiller load is calculated using the compressor speed and the refrigerant pressure. An air conditioning system includes one or more chillers. Each chiller includes a compressor (22), a condenser (30) operably connected to the compressor, and an evaporator (28) operably connected to the compressor and the condenser. A controller (34) is operably connected to the one or more
(Continued)

chillers and is configured to calculate a chiller load utilizing a measurement of compressor speed and a measurement of refrigerant pressure of the chiller.

11 Claims, 6 Drawing Sheets

(51) Int. Cl.
*F24F 3/06* (2006.01)
*F25B 5/02* (2006.01)
*F24F 140/50* (2018.01)

(52) U.S. Cl.
CPC .......... *F25B 49/02* (2013.01); *F24F 2140/50* (2018.01); *F25B 2400/06* (2013.01); *F25B 2500/19* (2013.01); *F25B 2600/0251* (2013.01); *F25B 2600/0253* (2013.01); *F25B 2700/1931* (2013.01); *F25B 2700/1933* (2013.01); *Y02B 30/70* (2013.01)

(56) References Cited

U.S. PATENT DOCUMENTS

| | | |
|---|---|---|
| 4,608,833 A | 9/1986 | Kountz |
| 4,949,276 A | 8/1990 | Staroselsky et al. |
| 5,355,691 A | 10/1994 | Sullivan et al. |
| 5,669,225 A | 9/1997 | Beaverson et al. |
| 5,746,062 A | 5/1998 | Beaverson et al. |
| 5,946,926 A | 9/1999 | Hartman |
| 6,269,650 B1 | 8/2001 | Shaw |
| 8,567,207 B2 | 10/2013 | Sommer et al. |
| 8,726,678 B2 | 5/2014 | Turney et al. |
| 8,813,511 B2 | 8/2014 | Kopko et al. |
| 2002/0021969 A1 | 2/2002 | Totsuka |
| 2010/0047080 A1 | 2/2010 | Bruce |
| 2012/0100011 A1 | 4/2012 | Sommer et al. |
| 2012/0260685 A1 | 10/2012 | Honda |
| 2013/0167567 A1 | 7/2013 | Fukui et al. |
| 2014/0026598 A1 | 1/2014 | Trawicki et al. |
| 2014/0216068 A1 | 8/2014 | Lee et al. |
| 2016/0054034 A1* | 2/2016 | Park .......................... F25B 7/00 62/172 |

OTHER PUBLICATIONS

Brasz, J. J., I. K. Smith, and N. Stosic. "Development of a twin screw expressor as a throttle valve replacement for water-cooled chillers." International Compressor Engineering Conference, Purdue University, (2000), 9pgs.

International Search Report and Written Opinion; International Application No. PCT/US2015/060341; International Filing Date: Nov. 12, 2015; dated Feb. 10, 2016; 12 pages.

* cited by examiner

ON BOARD CHILLER CAPACITY CALCULATION

CROSS-REFERENCE TO RELATED APPLICATIONS

This application is a National Stage application of PCT/US2015/060341 filed on Nov. 12, 2015, which claims the benefit of U.S. Provisional Application No. 62/079,999, filed Nov. 14, 2014, which are incorporated herein by reference in their entirety.

BACKGROUND

The subject matter disclosed herein relates to chiller systems. More specifically, the present disclosure relates to managing and controlling chiller operation.

Chiller systems, used for conditioning air in an office environment or other space, are switched on and off, or staged, at times in an attempt to optimize efficiency. This is especially true in systems utilizing multiple chillers, where one or more chillers may be operated at times to balance system efficiency with air conditioning needs of the space.

Chillers generally become more efficient as they unload to an inflection point, after which further unloading results in lower efficiency. In addition, operating more chillers than necessary may increase power consumption due to operation of the compressors, as well as of support equipment such as pumps. In some systems, flow is constant, so the product of flow and delta T, a measure of a difference in water temperature into and out of the chiller, can be used to calculate system capacity with an external controller. The system capacity is then compared to the available capacity of the operating chillers, and chillers are switched on or off accordingly to attempt to match the number of operating chillers with the air conditioning needs.

This method, however, does not work for systems where flow is variable. Conventional means for variable flow systems require external flow measurement(s) which can be an added cost and unreliable. This results in improper staging, poor plant control and reduction in efficiency.

BRIEF SUMMARY

In one embodiment, a method of controlling operation of an air conditioning system includes measuring a compressor speed of one or more chillers of an air conditioning system and measuring a refrigerant pressure of the one or more chillers of the air conditioning system. A chiller load is calculated using the compressor speed and the refrigerant pressure.

Additionally or alternatively, in this or other embodiments operational changes to the chiller are made based on the calculated load.

Additionally or alternatively, in this or other embodiments operation of the chiller is stopped based on the calculated load.

Additionally or alternatively, in this or other embodiments the measured refrigerant pressure is at least two refrigerant pressures.

Additionally or alternatively, in this or other embodiments the refrigerant pressure is measured at a condenser of the chiller and an evaporator of the chiller.

Additionally or alternatively, in this or other embodiments the chiller load is calculated for each chiller of one or more chillers of the air conditioning system.

Additionally or alternatively, in this or other embodiments operation of one or at least one chiller of the two or more chillers is started or stopped in response to the chiller load calculation.

In another embodiment, an air conditioning system includes one or more chillers. Each chiller includes a compressor, a condenser operably connected to the compressor, and an evaporator operably connected to the compressor and the condenser. A controller is operably connected to the one or more chillers and is configured to calculate a chiller load utilizing a measurement of compressor speed and a measurement of refrigerant pressure of the chiller.

Additionally or alternatively, in this or other embodiments the controller is configured to make operational changes to the chiller based on the calculated load.

Additionally or alternatively, in this or other embodiments the controller is configured to stop operation of the chiller based on the calculated load.

Additionally or alternatively, in this or other embodiments the measured refrigerant pressure is at least two refrigerant pressures.

Additionally or alternatively, in this or other embodiments the refrigerant pressure is measured at the condenser and at the evaporator.

Additionally or alternatively, in this or other embodiments the controller is configured to calculate the chiller load for each chiller of one or more chillers of the air conditioning system.

Additionally or alternatively, in this or other embodiments operation of at least one chiller of the one or more chillers is stopped or started in response to the chiller load calculation.

Additionally or alternatively, in this or other embodiments the compressor is a variable speed compressor.

The detailed description explains the invention, together with advantages and features, by way of examples with reference to the drawings.

DETAILED DESCRIPTION

Figure 1:
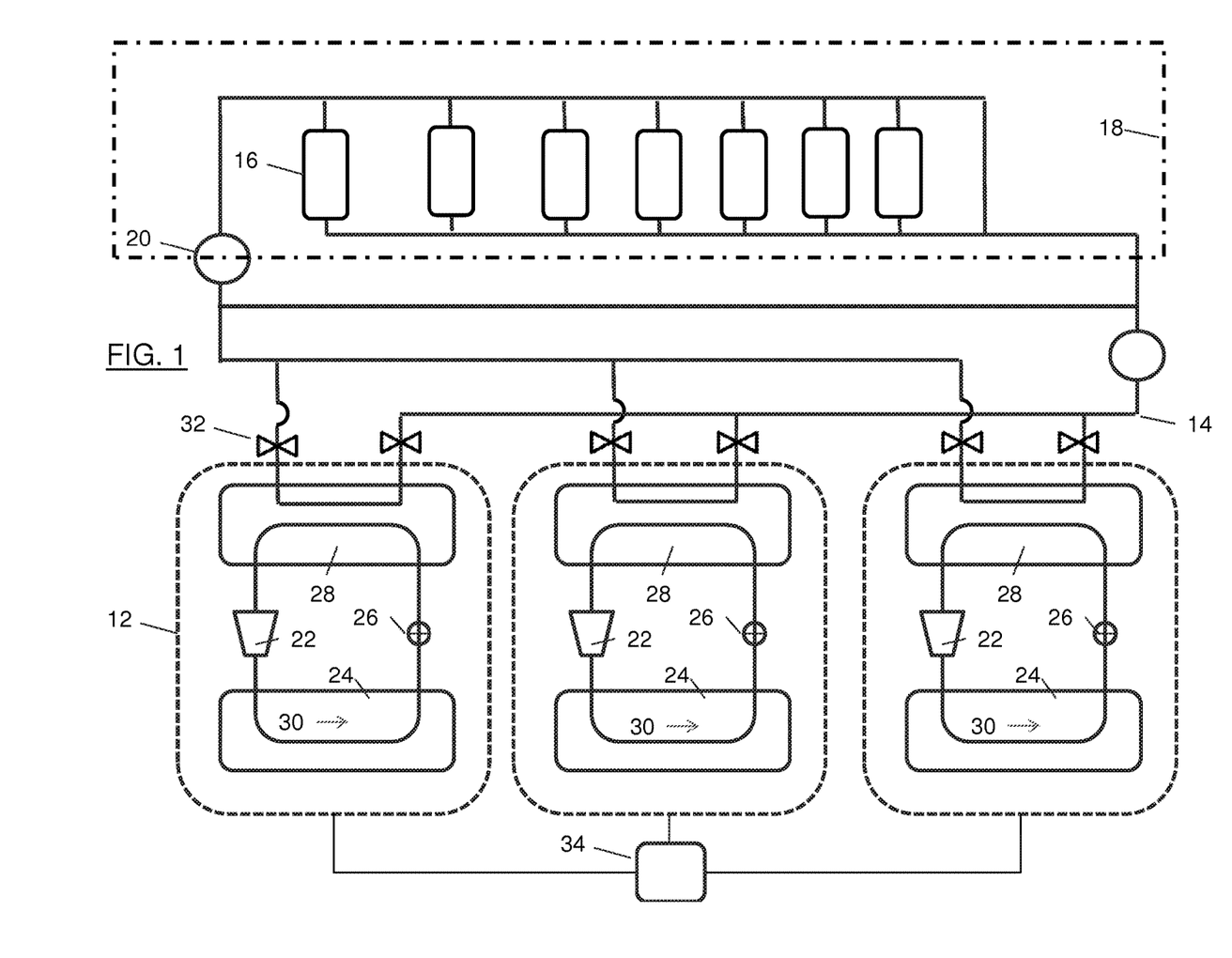
FIG. 1 is a view of an embodiment of an air conditioning system with parallel chillers in a primary/secondary pumping arrangement.

Shown in FIG. 1 is an exemplary air conditioning system 10. The air conditioning system 10 includes a plurality of chillers 12, which condition a heat transfer fluid 14, in some embodiments, water or brine solution. The conditioned heat transfer fluid 14 is circulated to a heat exchanger 16 at a space 18. The heat exchanger 16 facilitates an exchange of thermal energy between the heat transfer fluid 14 and air at the space 18 to condition the space 18 to a selected temperature. In some embodiments, the circulation of the heat transfer fluid 14 is driven by one or multiple pumps 20. While two chillers 12 are shown in the embodiment of FIG. 1, the number of chillers 12 is merely exemplary. Other quantities of chillers 12, for example three, four or more chillers 12, may be utilized.

Figure 2:
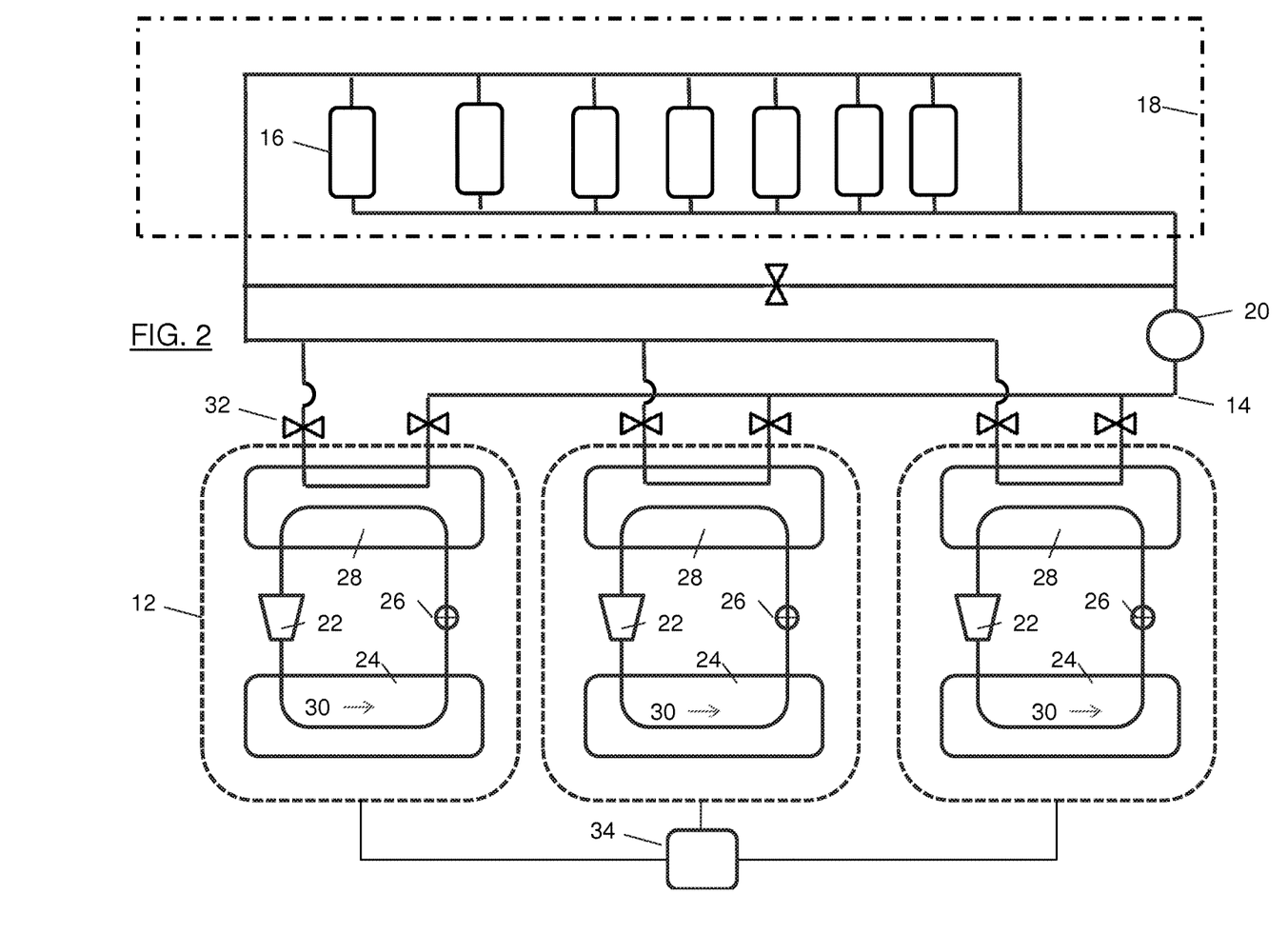
FIG. 2 is a view of an embodiment of an air conditioning system with parallel chillers in a variable primary pumping arrangement.
Figure 3:
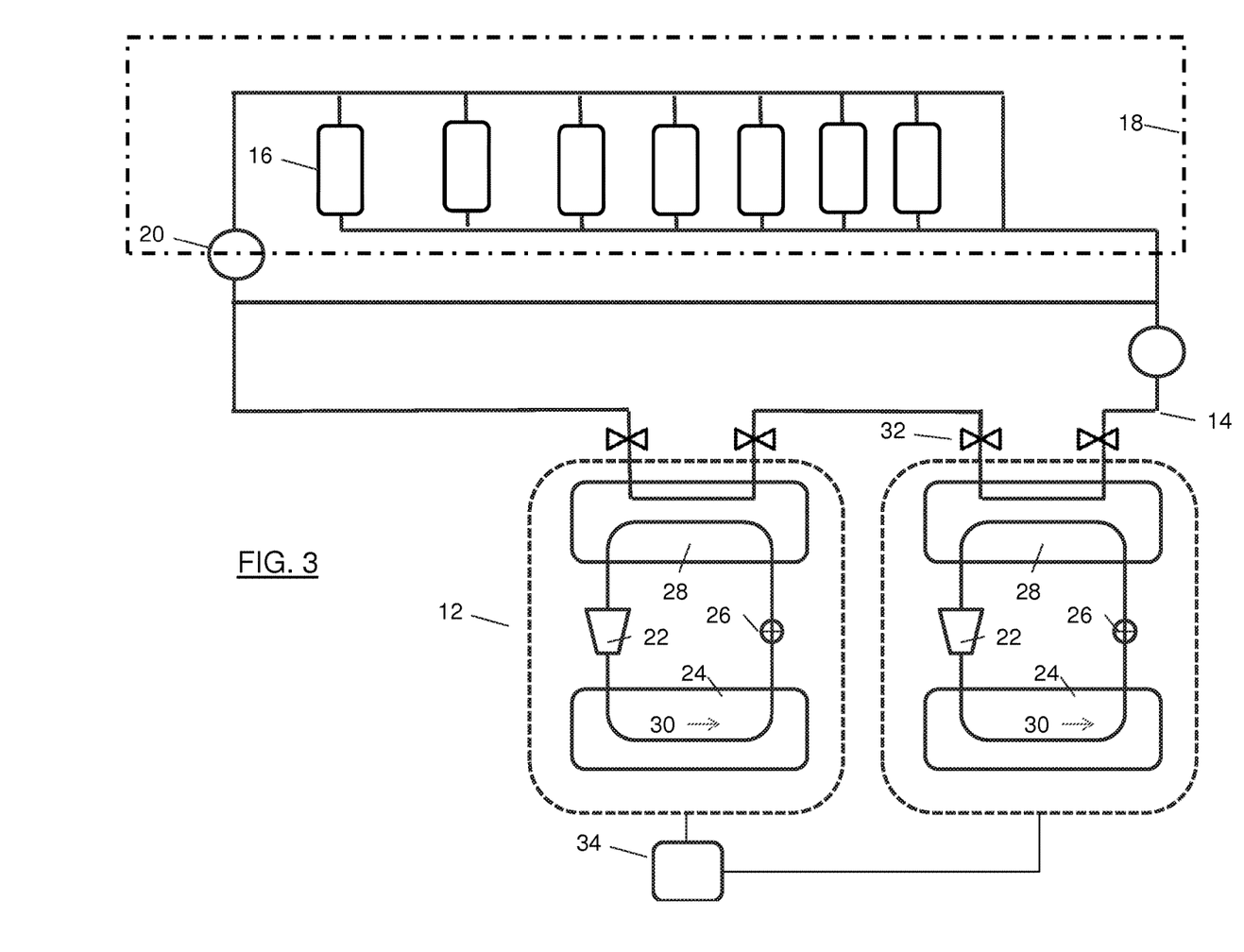
FIG. 3 is a view of an embodiment of an air conditioning system with series chillers in a primary secondary pumping arrangement.
Figure 4:
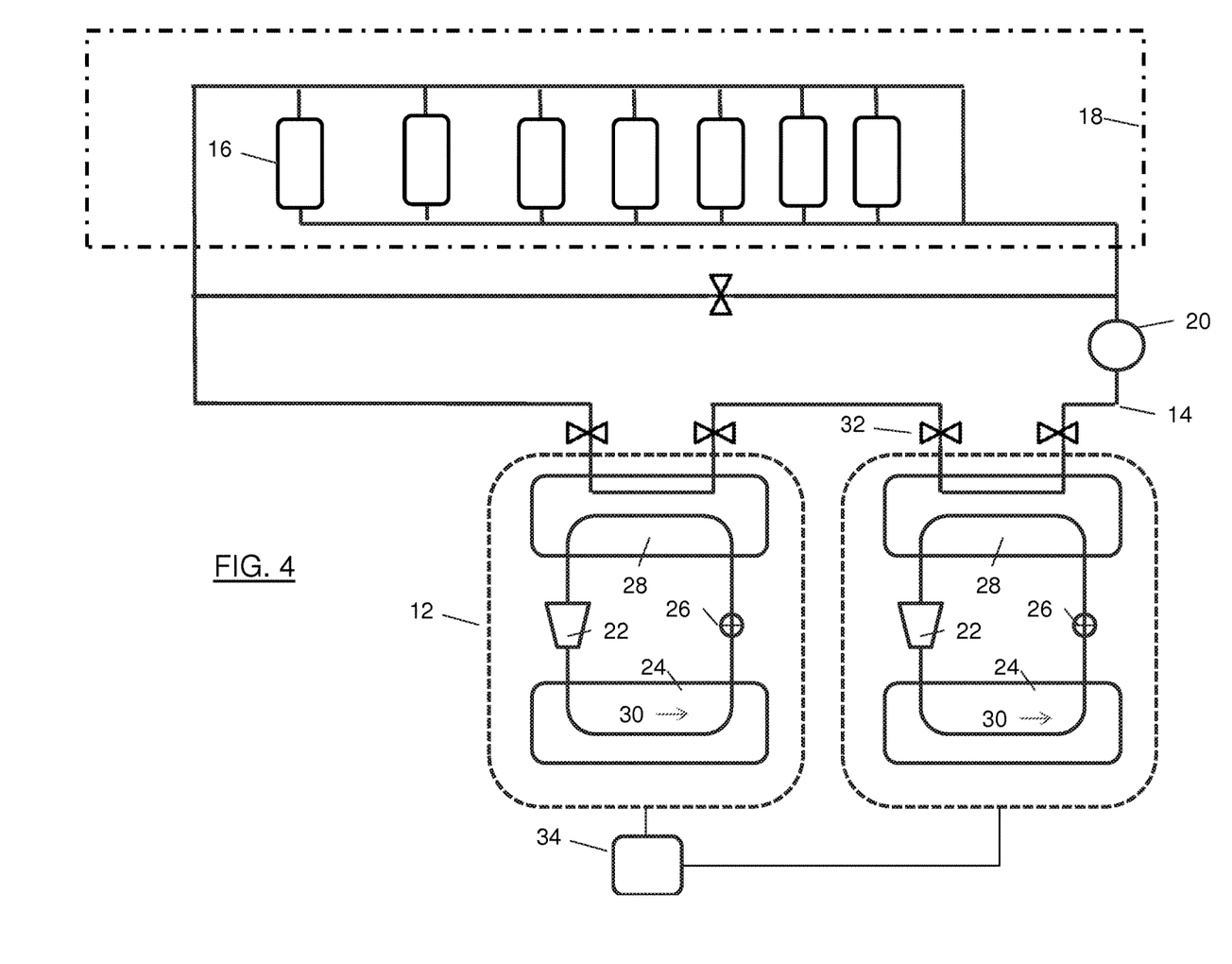
FIG. 4 is a view of an embodiment of an air conditioning system with series chillers in a variable primary pumping arrangement.

Each chiller 12 includes, in series, a compressor 22, a condenser 24, an expansion device 26 and an evaporator 28. A flow of refrigerant 30 circulates through the chiller 12 and the cold refrigerant 30 exchanges thermal energy with the heat transfer fluid 14 at the evaporator 28, cooling it prior to the heat transfer fluid 14 circulating to the heat exchanger 16. The multiple chillers 12 may be arranged in a parallel or series relationship connected via valves 32 to circulate heat transfer fluid 14 to the space 18. Alternative embodiments are shown in FIGS. 2-4. In the embodiment of FIG. 2, an alternative parallel arrangement of chillers 12 is shown, while in FIGS. 3 and 4, embodiments having serially-arranged chillers 12 are illustrated. Further, in some embodiments, the compressor 22 is a screw compressor and is operable at variable speeds.

The chillers 12 are further interconnected to an external controller 34. Referring to the schematic of FIG. 5, the controller 34 receives operating information from a chiller controller which receives the information from the components of the chillers 12 in block 100 and makes operational decisions with respect to the chillers 12 to turn one or more chillers 12 on and/or stop operation of one or more chillers 12 based on system 10 capacity and requirements of the space 18. In calculating capacity or load of the chillers 12, the controller 34 of the present disclosure does not utilize information gathered from outside the chiller 12, such as mass flow measurements, but utilizes information readily available and collected from the chiller 12 itself.

Figure 6:
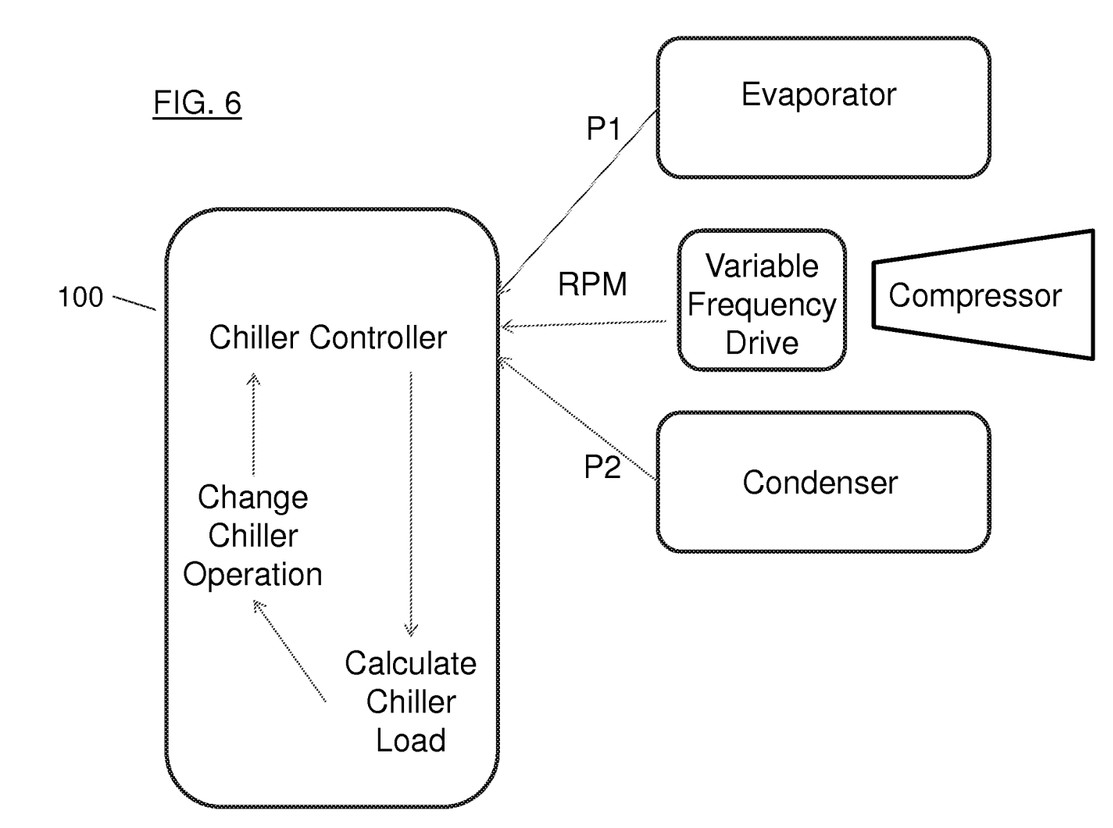
FIG. 6 is a schematic view of a method of calculating capacity of a chiller in an air conditioning system using the chiller controller.

The chillers 12 are further interconnected to an internal controller 34. Referring to the schematic of FIG. 6, the controller 34 receives operating information from the information from the components of the chillers 12 in block 100 and makes operational decisions with respect to the chillers 12 to turn one or more chillers 12 on and/or stop operation of one or more chillers 12 based on system 10 capacity and requirements of the space 18. In calculating capacity or load of the chillers 12, the controller 34 of the present disclosure does not utilize information gathered from outside the chiller 12, such as mass flow measurements, but utilizes information readily available and collected from the chiller 12 itself.

More specifically, referring again to FIG. 5, the capacity of the chiller 12 is calculated at block 104 utilizing compressor 22 speed, which is variable in this chiller 12 configuration, and measures of refrigerant 30 pressure in the chiller 12. In some embodiments, the refrigerant 30 pressures utilized are from upstream of the compressor 22 and downstream of the compressor 22, for example, refrigerant pressure at the evaporator 28 and refrigerant pressure at the condenser 24.

Figure 5:
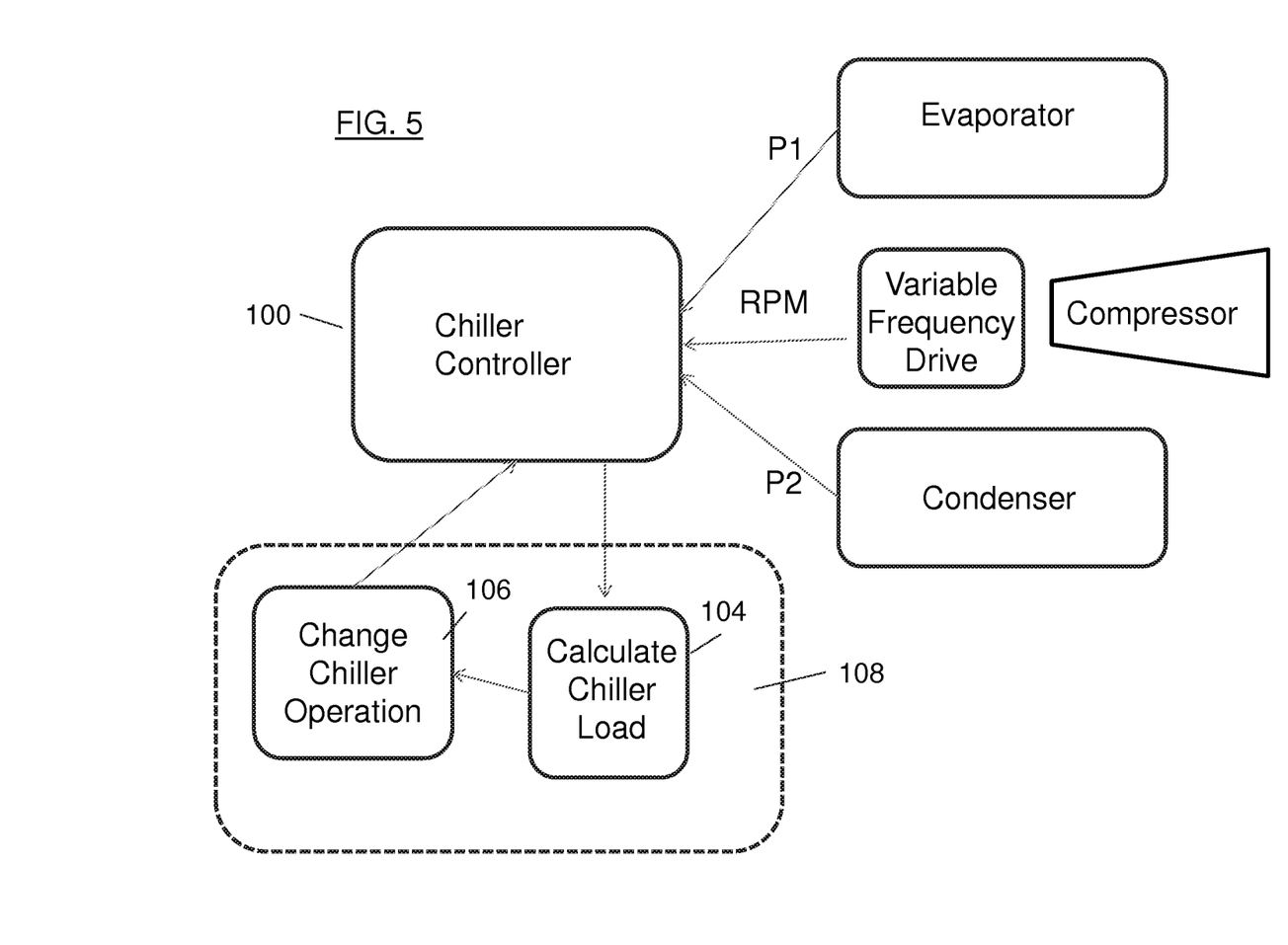
FIG. 5 is a schematic view of a method of calculating capacity of a chiller in chiller in an air conditioning system using an external controller.

In one embodiment, the calculation of percent load (L) is as shown in equation 1 below:

$$L = ((x_1 * RPM) - (x_2 * RPM)^2 - (y_1 * (SCT - SST)) + (y_2 * (SCT - SST))^2 - C) * (1 + (SST - y_3) * e) \quad (1)$$

Where RPM=compressor speed;
SCT=condenser refrigerant: pressure, expressed as a temperature;
SST=evaporator refrigerant pressure, expressed as a temperature; and $x_1$, $x_2$, $y_1$, $y_2$, $y_3$, C and e are constants whose value depends on specific chiller model, refrigerant type etc.

Available capacity of the chiller 12 can be found as 1 minus L. The controller 34 utilizes the calculated load of each chiller 12 to make decisions regarding operation of the chillers 12 at block 106 to optimize efficiency of chiller 12 operation, In a system 10 with three chillers 12, for example, conditioning needs of the space 18 and capacity of the chillers 12 may indicate that operating one chiller 12 instead of three chillers 12 is sufficient to meet the conditioning needs. So, the controller 34 may stop operation of one of two of the three chillers 12. Alternatively, it may be more efficient for the system 10 to operate two or more of the chillers 12 at a lower load, than one chiller at a higher load.

Utilizing refrigerant pressure and compressor speed measurements directly from the chiller 12 to determine chiller 12 load without external flow measurement reduces costs while improving reliability and repeatability of the calculation. By eliminating the external flow sensors, issues such as flow meters becoming uncalibrated can be eliminated, resulting in more long term repeatability. This also simplifies controls and operation of the plant. Further, the calculation can also be used to provide data to the customer regarding load, chiller efficiency and plant efficiency. It can further be used to improve control of condenser pumps and cooling towers since the load is known.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of controlling operation an air conditioning system including two or more chillers, comprising:
measuring a first compressor speed of a first compressor of a first chiller of the two or more chillers of the air conditioning system, the first chiller including:
the first compressor;
a first condenser operably connected to the first compressor; and
a first evaporator operably connected to the first compressor and the first condenser, a first flow of refrigerant circulating through the first compressor, first condenser and first evaporator, and exchanging thermal energy with a heat transfer fluid at the first evaporator;
measuring a second compressor speed of a second compressor of a second chiller of the two or more chillers of the air conditioning system, the second chiller including:
the second compressor;
a second condenser operably connected to the second compressor; and
a second evaporator operably connected to the second compressor and the second condenser, a second flow of refrigerant circulating through the second compressor, second condenser and second evaporator, and exchanging thermal energy with the heat transfer fluid at the second evaporator;

measuring a first refrigerant pressure of the first flow of refrigerant at the first evaporator of the first chiller of the two or more chillers of the air conditioning system;

measuring a second refrigerant pressure of the second flow of refrigerant at the second evaporator of the second chiller of the two or more chillers of the air conditioning system;

calculating a first chiller load of the first chiller using the first compressor speed and the first refrigerant pressure;

calculating a second chiller load of the second chiller using the second compressor speed and the second refrigerant pressure; and making operational changes to one or more of the first chiller and the second chiller in response to the calculated respective first chiller load and second chiller load;

wherein the first chiller is connected to the second chiller and to a common heat exchanger in a serial relationship via the heat transfer fluid to circulate the heat transfer fluid through the common heat exchanger; and selectably stopping the flow of heat transfer fluid through one or more of the first chiller or second chiller via operation of one or more valves at the first chiller or second chiller.

2. The method of claim 1, further comprising stopping operation of one or more of the first chiller and the second chiller based on the calculated respective first chiller load and second chiller load.

3. The method of claim 1, further comprising measuring a third refrigerant pressure at the first chiller and measuring a fourth refrigerant pressure at the second chiller.

4. The method of claim 3, wherein the refrigerant pressure is measured at the condenser of the chiller and the evaporator of the chiller.

5. The method of claim 1, further comprising stopping or starting operation of one or at least one of the first chiller or the second chiller in response to the chiller load calculation.

6. An air conditioning system comprising:
two or more chillers, the two or more chillers including:
  a first chiller including:
    a first compressor;
    a first condenser operably connected to the first compressor; and
    a first evaporator operably connected to the first compressor and the first condenser, a first flow of refrigerant circulating through the first compressor, first condenser and first evaporator, and exchanging thermal energy with a heat transfer fluid at the first evaporator; and
  a second chiller including:
    a second compressor;
    a second condenser operably connected to the second compressor; and
    a second evaporator operably connected to the second compressor and the second condenser, a second flow of refrigerant circulating through the second compressor, second condenser and second evaporator, and exchanging thermal energy with a heat transfer fluid at the second evaporator; and
  a controller operably connected to each chiller of the two or more chillers, the controller configured to calculate a chiller load of each of a first chiller of the two or more chillers and a second chiller of the two or more chillers utilizing a measurement of first compressor speed and second compressor speed, and a measurement of a first refrigerant pressure of the first flow of refrigerant and a second refrigerant pressure of the second flow of refrigerant, and the controller is configured to make operational changes to the one or more of the first chiller and the second chiller in response to the calculated respective loads of each of the first chiller and the second chiller;
wherein the first chiller is connected to the second chiller and to a common heat exchanger in a serial relationship via the heat transfer fluid to circulate the heat transfer fluid through the common heat exchanger; and
wherein the flow of heat transfer fluid through one or more of the first chiller or second chiller is stopped via operation of one or more valves at the first chiller or second chiller.

7. The system of claim 6, wherein the controller is configured to stop operation of one or more of the first chiller and the second chiller based on the calculated respective loads of each of the first chiller and the second chiller.

8. The system of claim 6, wherein the measured refrigerant pressure is at least two refrigerant pressures at each of the first chiller and the second chiller.

9. The system of claim 8, wherein the refrigerant pressure is measured at the condenser and at the evaporator of each of the first chiller and the second chiller.

10. The system of claim 6, further comprising stopping or starting operation of at least one of the first chiller or the second chiller in response to the chiller load calculation.

11. The system of claim 6, wherein the compressor is a variable speed compressor.

\* \* \* \* \*